US011203356B2

(12) United States Patent
Ritter

(10) Patent No.: US 11,203,356 B2
(45) Date of Patent: Dec. 21, 2021

(54) METHOD AND SYSTEM FOR SETTING A DRIVING MODE OF A VEHICLE

(71) Applicant: AUDI AG, Ingolstadt (DE)

(72) Inventor: Bernd Ritter, Böhmfeld (DE)

(73) Assignee: AUDI AG, Ingolstadt (DE)

(*) Notice: Subject to any disclaimer, the term of this patent is extended or adjusted under 35 U.S.C. 154(b) by 321 days.

(21) Appl. No.: 16/369,332

(22) Filed: Mar. 29, 2019

(65) Prior Publication Data
US 2019/0308638 A1 Oct. 10, 2019

(30) Foreign Application Priority Data

Apr. 4, 2018 (DE) ...................... 10 2018 205 039.2

(51) Int. Cl.
B60W 50/08 (2020.01)
B60W 30/18 (2012.01)
B62D 1/04 (2006.01)

(52) U.S. Cl.
CPC .... B60W 50/082 (2013.01); B60W 30/18072 (2013.01); B60W 30/18127 (2013.01); B62D 1/046 (2013.01); B60W 2540/215 (2020.02)

(58) Field of Classification Search
CPC ..... B60W 30/18072; B60W 30/18127; B60W 50/082; B60W 2540/215; B60W 50/085; B62D 1/046

(Continued)

(56) References Cited

U.S. PATENT DOCUMENTS 6,936,933 B2 * 8/2005 Wilmore ................ B60K 6/383
290/46
8,996,216 B2 * 3/2015 Schmidt .................. B60L 50/16
701/22

(Continued)

FOREIGN PATENT DOCUMENTS

DE 10 2010 004 846 A1 3/2011
DE 102011011345 A1 8/2012

(Continued)

OTHER PUBLICATIONS

Auto anti-interference sliding mode control based on active front steering; Huang Kai-qi;Lao Ling; The 27th Chinese Control and Decision Conference (2015 CCDC); IEEE Conference Paper; (Year: 2015).*

(Continued)

Primary Examiner — Cuong H Nguyen
(74) Attorney, Agent, or Firm — Maier & Maier, PLLC

(57) ABSTRACT

A method for setting a driving mode of a vehicle which is driven by at least one electric machine, wherein several levels of a recuperation mode and a coasting mode are provided for the vehicle mode, wherein a first operating step or a second operating step is carried out with an operating element, wherein a level of the recuperation mode is raised upon a one-time carrying out of the first operating step with the operating element, wherein a level of the recuperation mode is set by one-time carrying out of the first operating step with the operating element which level is higher than a lowest level of the recuperation mode, wherein the coasting mode is directly set up when carrying out the second operating step with the operating element starting from the set, in particular higher level of the recuperation mode.

14 Claims, 2 Drawing Sheets

(58) Field of Classification Search
USPC .................................... 701/22; 180/65.285
See application file for complete search history.

(56) References Cited

U.S. PATENT DOCUMENTS

| | | | | |
|---|---|---|---|---|
| 2004/0251758 | A1* | 12/2004 | Wilmore | B60K 6/26 310/112 |
| 2005/0021190 | A1* | 1/2005 | Worrell | B60K 35/00 701/1 |
| 2013/0197765 | A1* | 8/2013 | Schmidt | B60W 10/06 701/48 |
| 2014/0172208 | A1* | 6/2014 | Limbacher | B60W 50/08 701/22 |
| 2014/0228169 | A1* | 8/2014 | Leiber | F16H 63/304 477/15 |
| 2014/0285003 | A1* | 9/2014 | Mueller | B60L 15/20 307/10.1 |
| 2016/0052519 | A1 | 2/2016 | Martin et al. | |

FOREIGN PATENT DOCUMENTS

| | | |
|---|---|---|
| DE | 10 2012 222 348 A1 | 6/2014 |
| DE | 10 2014 207 065 A1 | 10/2015 |

OTHER PUBLICATIONS

Torque-vectoring control in fully electric vehicles via integral sliding modes; Tommaso Goggia;Aldo Sorniotti;Leonardo De Novellis; Antonella Ferrara; 2014 American Control Conference; IEEE Conference Paper (Year: 2014).*

Rongjun Zhang and Yaobin Chen, "Control of hybrid dynamical systems for electric vehicles," Proceedings of the 2001 American Control Conference. (Cat. No. 01CH37148), 2001, pp. 2884-2889 vol. 4, doi: 10.1109/ACC.2001.946338 . . . . (Year: 2001).*

Vehicle Inertia Impact on Fuel Consumption of Conventional and Hybrid Electric Vehicles Using Acceleration and Coast Driving Strategy, Doctoral Dissertation of Lee, Jeongwoo; from http://scholar.lib.vt.edu/theses/available/etd-09172009-234744. (Year: 2009).*

Reducing fuel consumption and related emissions through optimal sizing of energy storage systems for diesel-electric trains; by Marko Kapetanovic et al.; Applied Energy; vol. 294, Jul. 15, 2021, 117018 (Year: 2021).*

S. Buryakovskiy, A. Maslii, D. Pomazan, A. Maslii, O. Panchuk and A. Rybin, "Study of Methods for Charging of Energy Storage Devices of Railway Traction Units," 2020 IEEE Problems of Automated Electrodrive. Theory and Practice (PAEP), 2020, pp. 1-5, doi: 10.1109/PAEP49887.2020.9240794; (Year: 2020).*

Examination Report dated Mar. 18, 2019 of corresponding German application No. 10 2018 205 039.2; 7 pages including Partial Machine-generated English-language translation.

Examination Report dated Oct. 7, 2019, in corresponding European patent application No. 19 162 473.3 including partial machine-generated English language translation; 11 pages.

* cited by examiner

METHOD AND SYSTEM FOR SETTING A DRIVING MODE OF A VEHICLE

FIELD

The disclosure relates to a method and a system for setting a driving mode of a vehicle.

BACKGROUND

A motor vehicle which is driven by at least one electric machine can be driven in different driving modes, wherein a particular driving mode is selected and set by a passenger of the motor vehicle.

A current recuperation mode comprises two possible variants in which a shift is made between a recuperation mode and a coasting mode.

In a first variant a shifting back and forth is made directly between the coasting mode and a maximum recuperation mode.

The recuperation mode of the electrically driven Up® of the Volkswagen® brand, in the following eUp®, can be cited as an example here. A tipping operation of the gearshift to the rear is used here. In the starting level in the "D" driving level the eUp® is in the so-called coasting mode, i.e., when the drive pedal is released, the vehicle rolls. A shift into the maximum recuperation mode "B" is made by tipping the gearshift back, i.e., the vehicle begins to stall strongly without mechanically braking since the e-engine shifts from neutral (coasting) to generator mode (recuperation) and converts the kinetic energy of the vehicle into electrical energy and stores the latter in the vehicle battery. The vehicle recuperates with the maximum recuperation level. Upon a further tipping movement of the gearshift to the rear the coasting mode "D" is set again.

In a second variant, several levels are provided for the recuperation mode, wherein, on the one hand, a gradual elevation of a level of the recuperation mode starting from the coasting mode and a gradual reduction of the levels of the recuperation mode toward the coasting mode are possible.

The recuperation movement of the electrically operated eUp® can also be cited as an example here. A tipping gearshift movement to the left and to the right is also carried out here. In the starting state in the driving level "D" the eUp® is in the coasting operation. Proceeding from here, upon a first movement of the gearshift to the left, a first level for the recuperation mode is set, i.e., the vehicle begins to stall slightly. Upon a tipping gearshift movement to the left, a second level is adjusted for the recuperation mode, i.e., the vehicle increases the stalling to the second of a total of four levels. Furthermore, it is possible to set a third level for the recuperation mode by moving the gearshift to the left. If, proceeding from here, the gearshift is tipped to the right, the second level for the recuperation mode is set again. By a further tipping to the right, the first level for the recuperation operation is set. Accordingly, it is possible to reset the coasting operation if the gearshift is moved to the right by another tipping.

Publication DE 10 2010 004 846 A1 shows a method and a control device for the recuperation for a motor vehicle.

A method for actuating a coasting mode in a motor vehicle is known from publication DE 10 2012 222 348 A1.

Publication DE 10 2014 207 065 A1 describes a method for carrying out a user-defined recuperation.

Given this background, the object was to effectively control a driving mode of a vehicle with an operating element.

SUMMARY

This object is solved by a method and a system with the features of the independent claims. Embodiments of the method and of the steering are apparent from the dependent claims.

The method according to the invention is provided for setting a driving mode of a vehicle which is driven by at least one electric machine, wherein several, namely n greater than or equal to two (n≥2) levels of a recuperation mode and of a coasting mode are provided for the driving mode. Either a first operating step or a second operating step is carried out with an operating element. A level of the recuperation mode is raised here upon a one-time carrying out of the first operating step with the operating element, wherein upon a repeated carrying out of the first operating step with the operating element a level of the recuperation mode is set which is usually higher than a lowest level of the recuperation mode. Moreover, the coasting mode is directly set when carrying out the second operating step with the operating element starting from the particular set level, in particular a higher level, of the recuperation mode.

In an embodiment, e.g., the coasting mode is set as a driving mode or driving operation during the release of or by releasing a driving pedal of the vehicle or starting from the release of the driving pedal, wherein the vehicle rolls out of the drive train in the coasting mode without any delay moment. The first operating step or the second operating step is carried out in the coasting mode by the operating element. The first level of the recuperation mode is switched to upon a one-time execution of the first operating level with the operating element, starting from the coasting mode or from a driving mode, in which the vehicle is driven by at least one engine, i.e., the vehicle begins to slightly stall without the brake being actuated. As a result of a repeated or subsequent multiple execution of the first operating step with the operating element, the particular set level of the recuperation mode is increased by at least one further level. Furthermore, when carrying out the second operating level with the operating element starting from any active level of the recuperation mode, the coasting mode is directly set again, i.e., the vehicle ends a stalling which results from a particular or k-th level of the recuperation mode, wherein the particular level was previously actuated by carrying out the first operating level k times. Therefore, the vehicle switches directly into the coasting mode by carrying out the second operating level from the recuperation mode. The vehicle is constructed and/or is designated as a motor vehicle and comprises at least one engine constructed as an electric engine for driving the vehicle. The vehicle can optionally additionally comprise an engine constructed as an internal combustion engine.

In the method, a selection is made with the operating element between the particular set higher level for the recuperation mode as driving mode and the coasting mode as driving mode. It is possible here that the first as well as the second operating step can be carried out with the operating element, wherein these two operating steps are carried out alternatively. The operating element is used here and at first the higher level for the recuperation mode is selected and set for the vehicle, in particular the at least one element machine. Furthermore, the operating element is operated again thereafter and then the coasting mode is directly selected and set starting from the selected and set higher level for the recuperation mode. Therefore, it is possible to shift from any level of the recuperation mode directly into the coasting mode. The higher level of the recuperation mode corresponds at least to a second level and is higher than a first, lowest level of the recuperation mode.

If, e.g., a k-th level of a total of n levels of the recuperation mode is to be set, the first operating step is carried out k times in succession, starting from a normal driving method or the coasting mode. Regardless of how often the first operating step was successively carried out, the coasting mode is set already only by a one-time carrying out of the second operating step.

As a rule, when carrying out the first operating step a first movement is made and when carrying out the second operating step a second movement is made, wherein these two movements are different, e.g., are opposingly oriented.

As a rule, several levels are provided and/or will be provided for the recuperation mode and/or for a recuperation.

In an embodiment, the coasting mode is selected and directly set with the operating elements starting from each currently set and/or selected level of the recuperation mode, e.g., also starting from the lowest or the highest level.

An operating element is used in the framework of the method which comprises at least one selection switch or selection button with which the first operating step and the second operating step are carried out, wherein the level for the recuperation mode is selected, e.g., from one level to the next higher one, and wherein the coasting mode is selected during and/or by carrying out the second operating step. The first operating step is carried out with the first movement of the at least one selection switch. The second operating step is carried out with the second movement of the at least one selection switch.

An operating element can be used in the method which comprises only one selection switch or selection button with which the first movement associated with the first operating step and the second movement associated with the second operating step are carried out, wherein these two movements are opposed to one another or are disjunctive to one another, wherein while carrying out the first movement the level for the recuperation mode is selected, e.g., raised, and wherein while and/or carrying out the second movement the coasting mode is selected.

An operating element can also be used which comprises two selection switches or selection buttons, wherein the first movement connected to the first operating step is carried out by a first selection switch and the second movement connected to the second operating step is carried out by a second selection switch, wherein these two movements are opposed to one another in a possible embodiment, wherein the level for the recuperation mode is selected, e.g., raised, by operating the first selection switch while carrying out the first movement and wherein the coasting mode is selected by operating the second selection switch while and/or by carrying out the second movement.

In an embodiment, the vehicle is accelerated by setting and/or selecting the coasting mode, starting from the current or first set and/or selected level of the level of the recuperation mode.

In the method, the negative acceleration of the vehicle resulting from setting and/or selecting the coasting mode starting from the current or first set and/or selected level of the recuperation mode is reduced to a zero delay by the drive train. This change or a corresponding delta jump of the negative acceleration of the vehicle is perceived by the passengers of the vehicle due to an inertia of its mass as acceleration.

It is also possible here that the at least one electric machine is operated in the first set and/or selected level of the recuperation mode as a generator. The at least one electric machine is turned off in the coasting mode and/or separated from a drive train of the vehicle.

The system according to the invention is designed to set a driving mode of a vehicle which is driven by at least one electric machine, wherein several levels of a recuperation mode and a coasting mode are provided for the driving mode. The system comprises an operating element for carrying out a first operating step or a second operating step as an alternative to the first operating step. A level of the recuperation mode is raised upon the one-time carrying out of the first operating step with the operating element. A level of the recuperation mode is set which is higher than a lowest level of the recuperation mode by a multiple, i.e., at least double carrying out of the first operating step with the operating element. On the other hand, the coasting mode is directly set by carrying out the second operating step with the operating element starting from the set higher level of the recuperation mode.

The operating element is designed and constructed to switch between at least one level for the recuperation mode as driving mode and the coasting mode as driving mode upon a corresponding operation. It is conceivable to first select or make selectable and to set or make settable a higher level of the at least one level for the recuperation mode for the vehicle, in particular the at least one element machine by operating the operating element. It is possible by another operation of the operating element that the coasting mode can then be directly selected and set, is to be selected or can be selected and set or can be set starting from the particular selected and set level for the recuperation mode.

The operating element comprises at least one selection switch or selection button with which the first operating step and the second operating step can be carried out or are to be carried out and/or is carried out, wherein the level for the recuperation mode is selected by the at least one selection switch while and/or by carrying out the first operating step, which is connected to a first movement or is defined by it, and wherein the coasting mode is to be selected or can be selected and/or is selected by the at least one selection switch during and/or by carrying out the second operating step, which is connected to a second movement different from the first movement or is defined by it.

In an embodiment, the operating element comprises only one selection switch or selection button with which the first movement connected to the first operating step and the second movement connected to the second operating step are to be carried out or can be carried out and/or are carried out, wherein the level for the recuperation mode can be selected or is to be selected and/or is selected while carrying out the first movement, and wherein the coasting mode is to be selected or can be selected and/or is selected while and/or by carrying out the second movement.

It is also possible that the operating element comprises two selection switches or selection buttons, i.e., a first selection switch and a second, additional selection switch, wherein the first movement connected to the first operating step is to be carried out or can be carried out and/or is carried out by the first selection switch and the second movement connected to the second operating step is to be carried out or can be carried out and/or is carried out by the second selection switch. The level for the recuperation mode is selected by operating the first selection switch while carrying out the first movement. The coasting mode is selected by operating the second selection switch while and/or by carrying out the second movement.

The two movements corresponding to the two operating steps which can be carried out are different, e.g., opposed to one another, in particular when using only one selection switch for the first and the second movement. The first movement can be oriented to the right and the second one to the left or vice versa. Furthermore, the first movement can be oriented upward and the second one downwards or vice versa.

It is possible here that a selection switch is designed as a sliding button (shifter), or that two selection switches are designed as push buttons on a steering wheel rocker. A device already installed in the vehicle, e.g. a steering wheel, can be used as operating element.

The presented method is provided for a vehicle constructed as an electrical traction vehicle, wherein a recuperation mode is carried out with the method for the vehicle. The vehicle is constructed, e.g., as a hybrid vehicle, electrical vehicle or a fuel cell vehicle (PHEV, BEV). It is provided in each case that the at least one electric machine of the vehicle makes electrical energy available, starting from an electrical energy source, e.g., a battery and/or a fuel cell, which energy is converted by the at least one electric machine into mechanical energy for driving or moving the vehicle. The at least one electric machine is operated as an engine. Inversely, it is also possible that the at least one electric machine converts mechanical energy into electrical energy which, in turn, is stored in an electrical energy store and therefore in a battery of the vehicle. In this case, the at least one electric machine is operated as a generator, wherein the recuperation mode or the recuperation is carried out.

The coasting mode for the vehicle is usually defined as a possible driving mode, in that the driver of the vehicle removes his foot from a foot pedal and the vehicle rolls without recuperation. In the case of a recuperation mode, the foot is also removed from the driving pedal, wherein the vehicle is delayed according to a particular set level for the recuperation mode, in particular according to a maximum recuperation mode (One-Paddle-Feeling). An extent of a delay of the vehicle is, again, a function of the particular set level for the recuperation mode.

It is possible with the method, independently of which level of the recuperation mode was set particularly for the vehicle, to reset the coasting mode in which the vehicle rolls without recuperation with the operating element by carrying out the second operating step and the corresponding second movement. The operating element in this embodiment comprises two selection switches or selection buttons, wherein each selection switch is constructed as a steering wheel rocker and in this case the steering wheel with its steering wheel rockers is used as an operating element.

Furthermore, e.g., a left steering wheel rocker or left push button of the steering wheel is used as a selection switch for setting a level for the recuperation mode and a right steering wheel rocker or a right push button of the steering wheel is used as a second selection switch for directly setting the coasting mode from any level of the recuperation mode.

In a possible embodiment, the vehicle is in a starting state in the coasting mode as driving mode or in an engine driving mode. A first, lowest level for the recuperation mode is set by a one-time operation of the left push button or of the first selection switch, starting from the coasting mode or the engine driving mode. Furthermore, it is possible to operate the left push button and therefore the first selection switch at least one more time and to therefore set a second or higher level for the recuperation mode after another operation of the first selection switch, a third, also higher level for the recuperation mode after another operation of the first selection switch, etc., wherein a particular level for the recuperation mode is raised by operating the first selection switch. If the first selection switch is operated, e.g., k times starting from the coasting mode or the engine driving mode, it is possible to set a k-th level for the recuperation mode or the recuperation. Independently of which level is set for the recuperation mode, the coasting mode is directly and immediately set for the recuperation mode by a one-time operating of the second selection switch after at least a one-time operation of the first selection switch by a set k-th level.

Therefore, it is possible to directly actuate the coasting mode for the recuperation mode with the operating element independently of the particular, actually set level.

A possible embodiment of the method can be carried out, e.g., when traveling with the vehicle through a curve. It is provided here that the coasting mode is set for the vehicle even before reaching the curve, at first by releasing the driving pedal, wherein the vehicle speed is already reduced by a resistance of air and rolling. Successive, different levels for the recuperation mode are set by multiply operating the operating element via the first operating step, wherein a strength for the recuperation mode is gradually increased. Therefore, it is possible to at first set the lowest level for the recuperation mode for the vehicle and gradually higher levels for the recuperation mode, gradually delaying the vehicle. This takes place without actuating the brake pedal and without having to set a maximum level for the recuperation mode right away.

Such a procedure can be compared to a braking or slowing down of a conventional vehicle before the curve. To the extent that the vehicle is located, e.g., in a top point of the curve, wherein any level for the recuperation mode is set for the vehicle, the coasting mode can be directly set in the framework of the method from the particular set level of the recuperation mode and the negative acceleration, in particular, a negative acceleration of the drive train to zero can be reduced for the vehicle. Therefore, it is possible, by ending the negative acceleration caused by a particular level of the recuperation mode and by directly actuating the coasting mode, to accelerate the vehicle out of the curve by the inertia of a mass of the passengers, which is felt by the passengers. It is possible by such an operating and influencing of the driving mode of the vehicle to increase the driving fun and at the same time to increase the efficiency of the driving mode and the driving operation.

Therefore, it is possible in an embodiment of the method to use a particular set level for the recuperation mode and to therefore use the recuperation mode as a replacement for a braking of the vehicle, wherein the vehicle is not delayed in this case by actuating the brake but rather by converting mechanical energy, in particular kinetic energy based on a movement of the vehicle, into electrical energy by the at least one electric machine and to generate current at the same time by the at least one electric machine. A rapid, direct shifting back from any level for the recuperation mode into the coasting mode is possible in the method, wherein the vehicle is stalled in a particular level of the recuperation mode and is accelerated in a perceived manner in the coasting mode starting from the particular level of the recuperation mode. The coasting mode can be set when carrying out the method from any level for the recuperation mode. Therefore, the actuation of the coasting mode is possible not only from the maximum or the minimum level for the recuperation mode.

Prior to travel into the curve, the vehicle is slowed down or braked by a gradual increasing of the strength of the recuperation mode or of the recuperation based on a successive increasing of the levels for the recuperation mode so that the maximum level for the recuperation mode does not have to be set immediately. This is comparable to an operation of a brake pedal of a conventional vehicle with an internal combustion engine which is at first stepped on only slightly, wherein a pressure is increased on the brake pedal as needed. A direct shifting back into the coasting mode is subsequently possible in the framework of the invention independently of which level is currently set for the recuperation mode, which corresponds, e.g., to a change of the brake pedal of a conventional vehicle with an internal combustion engine on the brake pedal, wherein the vehicle is accelerated in a perceptible manner out of the curve by a direct setting of the coasting mode. Therefore, it is no longer necessary to reset the recuperation mode gradually or in increments by multiple operation, which is time-consuming and inefficient.

Of course, the previously cited features and those still to be explained in the following can be used not only in the particular indicated combination but also in other combinations or by themselves without departing from the scope of the present invention.

BRIEF DESCRIPTION OF THE DRAWINGS

The invention is schematically represented in the drawings using embodiments and is schematically described in detail with reference made to the drawings.

DETAILED DESCRIPTION

Figure 1:
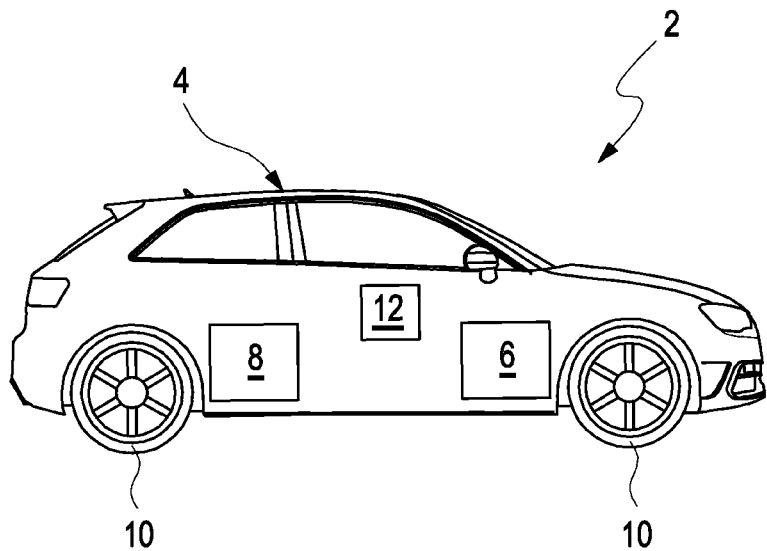
FIG. 1 shows a schematic view of an embodiment of the system according to the invention for a vehicle for carrying out an embodiment of the method according to the invention.

The schematically shown embodiment of the system 2 according to the invention shown in FIG. 1, is provided here as vehicle 4 constructed as and/or to be designated as a motor vehicle. The vehicle 4 comprises at least one electric machine 6, at least one electrical energy store 8 constructed here as a battery and several wheels 10 for moving the vehicle 4.

Several driving modes can be set and/or executed for the vehicle 4. In order to drive the vehicle 4, electrical energy is transmitted from the energy storage 8 or optionally from an energy source, e.g., from a fuel cell if the vehicle 4 is be constructed as a fuel cell vehicle, to the at least one electric machine 6, which is operated in this case as an engine and converts the electrical energy into mechanical energy by which the wheels 10 are turned and the vehicle 4 is driven and therefore moved, wherein an engine-driven driving mode is carried out for the vehicle 4.

Furthermore, in order to brake the vehicle 4, it is provided that the at least one electric machine 6 is operated as a generator and a recuperation mode is set as a braking driving mode for the vehicle 4, wherein mechanical energy resulting from the movement of the vehicle 4 is converted back into electrical energy by the at least one electric machine 6 and is transmitted further to the at least one electrical energy storage 8. It is also provided here that different levels and therefore different strengths can be set for the recuperation mode.

Figure 2:
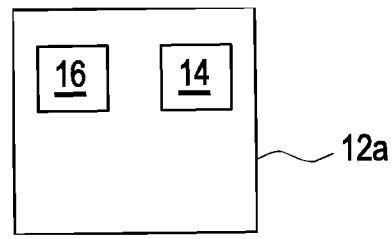
FIG. 2 shows a schematic view of a first variant of an operating element of the embodiment of the system according to the invention in FIG. 1.
Figure 3:
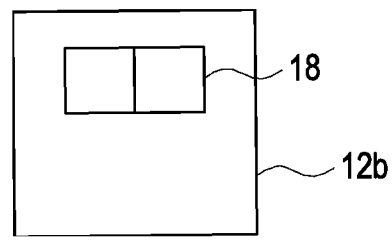
FIG. 3 shows a schematic view of a second variant of an operating element for the embodiment of the system according to the invention in FIG. 1.

An operating element 12 of the vehicle 4 is used when carrying out the embodiment of the method. In configuration, a first variant of the operating element 12a which is schematically shown in FIG. 2 can be used, or the second variant of the operating element 12b schematically shown in FIG. 3 can be used. The first variant 12a comprises a first selection switch 14 and a second selection switch 16. The second variant of the operating element 12b comprises only one selection switch 18. Therefore, each variant of the operating element 12, 12a and 12b comprises at least one selection switch 14, 16, 18.

Furthermore, a first operating step and/or at least one second operating step for actuating the operating element 12, 12a or 12b can be carried out by the at least one selection switch 14, 16, 18. It is provided here for the recuperation mode of the vehicle 4 that several, e.g., n levels are possible for the recuperation mode, wherein n≥2. A level of the recuperation mode is to be raised here by a one-time carrying out of the first operating step. If the vehicle 4 is originally in a driven engine driving mode or in the coasting mode, the first, lowest level of the recuperation mode is carried out by a one-time carrying out of the first operating step. A level of the recuperation mode is raised in a corresponding manner by a renewed carrying out of the first operating step. If the second operating step is carried out in the framework of the method, the coasting mode is set immediately and/or directly, independent of which level should currently be set for the recuperation mode.

If the method is carried out with the first variant of the operating element 12a, the first operating step is carried out by operating and/or actuating the first selecting switch 14. In contrast thereto, the second operating step is carried out by operating the second selection switch 16.

If the method is carried out with the second variant of the operating element 12b, which has only one selection switch 18, the first operating step is carried out by actuating and/or operating this one selection switch 18 while carrying out a first movement in a first direction, in contrast to which the second operating step is carried out by actuating and/or operating the one selection switch 18 while carrying out a second movement different from the first movement in a second direction. It is possible here that the first movement and/or the first direction and the second movement and/or direction are opposingly oriented.

Independently of with which variant of the operating element 12, 12a, 12b the method is carried out and therefore a particular driving mode of the vehicle 4 is set, a level of the recuperation mode is usually gradually raised by carrying out the first operating step, in contrast to which the coasting mode is directly set by a one-time carrying out of the second operating step from any currently set level of the recuperation mode. This results in the fact for a passenger of the vehicle 4, based on an inertia of his/her mass, that the vehicle stalled by the recuperation mode is perceived to be accelerated by him/her by directly shifting into the coasting mode.

Figure 4:
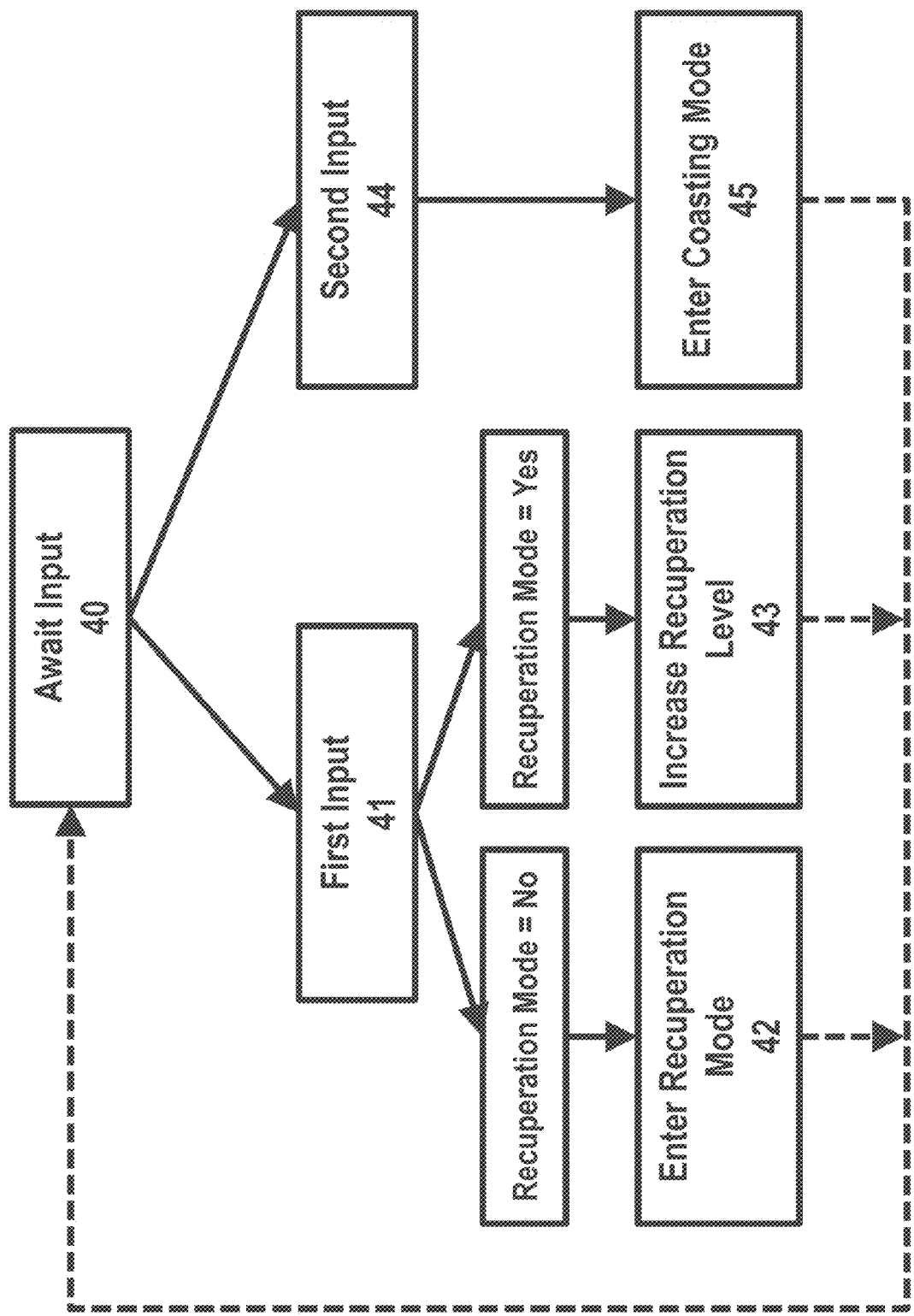
FIG. 4 shows a flow chart of an embodied method according to the invention.

In FIG. 4, an illustration of the method is provided. In step 40, the vehicle 4 awaits the first operating step and/or the second operating step to be entered via the operating element 12. If the vehicle 4 receives through the first operating step a first input 41, it is checked whether the vehicle is currently in a recuperation mode. If the vehicle 4 is not in a recuperation mode upon entry of the first input 41, the vehicle 4 enters into a recuperation mode at a lowest level 42. If the vehicle 4 is already in a recuperation mode upon entry of the first input 41, the vehicle 4 increases the level of the recuperation mode to a next-highest level 43. If the vehicle 4 receives through the second operating step a second input 44 and the vehicle is currently in a recuperation mode, the vehicle directly switches over from the recuperation mode to the coasting mode 45. After processing each input, the method returns and awaits input 40.

REFERENCE NUMERALS

System 2
Vehicle 4
Electrical machine 6
Energy storage 8
Wheel 10
Operating element 12, 12a, 12b
Selection switch 14, 16, 18

The invention claimed is:

1. A method for setting a driving mode of a vehicle comprising:
   driving at least one electric machine,
   wherein the driving mode is provided with a coasting mode and a recuperation mode which comprises a plurality of levels,
   wherein the vehicle is provided with an operating element which has a first input and a second input,
   wherein the recuperation mode is entered and the level of the recuperation mode is set to a lowest level of the recuperation mode upon a first actuation of the first input of the operating element,
   wherein the level of the recuperation mode is successively raised upon successive actuations of the first input of the operating element to levels higher than the lowest level of the recuperation mode,
   wherein, upon actuation of the second input of the operating element, the vehicle leaves the recuperation mode and directly enters the coasting mode,
   wherein the coasting mode may be entered directly from the levels higher than the lowest level of the recuperation mode.

2. The method according to claim 1, wherein actuating the first input of the operating element requires a first movement and actuating the second input of the operating element requires a second movement.

3. The method according to claim 1, wherein the vehicle is perceptually accelerated by an inertia of a mass of a passenger when leaving the recuperation mode and entering the coasting mode.

4. A system for setting a driving mode of a vehicle which is driven by at least one electric machine,
   wherein the driving mode is provided with a coasting mode and recuperation mode which comprises a plurality of levels,
   wherein the system comprises an operating element which has a first input and a second input,
   wherein the recuperation mode is entered and the level of the recuperation mode is set to a lowest level of the recuperation mode upon a first actuation of the first input of the operating element,
   wherein the level of the recuperation mode is successively raised upon successive actuations of the first input of the operating element to levels higher than the lowest level of the recuperation mode,
   wherein, upon actuation of the second input of the operating element, the vehicle leaves the recuperation mode and directly enters the coasting mode,
   wherein the coasting mode may be entered directly from the levels higher than the lowest level of the recuperation mode.

5. The system according to claim 4, wherein the operating element comprises:
   at least one selection switch with which the first input and the second input can be actuated.

6. The system according to claim 5, wherein the at least one selection switch actuates the first input upon a first movement and actuates the second input upon a second movement.

7. The system according to claim 4, wherein the operating element comprises:
   two selection switches, wherein the first input is actuated by a first movement of a first of the two selection switches and the second input is actuated by a second movement of a second of the two selection switches.

8. The system according to claim 6, wherein the first and second movements are opposite one another.

9. The system according to claim 5, wherein the at least one selection switch is formed as a sliding button or a push button of a steering wheel rocker.

10. The system according to claim 7, wherein the two selection switches are each formed as a push button of a steering wheel rocker.

11. The system according to claim 4, wherein the operating element comprises:
    a selection switch with which the first input is actuated by a first movement of the selection switch and the second input is actuated by a second movement of the selection switch.

12. The system according to claim 4, wherein the recuperation mode may be entered while the at least one electric machine is still driving the vehicle and results in a partial stalling of the at least one electric machine.

13. The system according to claim 11, wherein the first and second movements are opposite one another.

14. The method according to claim 1, wherein the recuperation mode may be entered while the at least one electric machine is still driving the vehicle and results in a partial stalling of the at least one electric machine.

* * * * *